United States Patent
Ohtsu

(10) Patent No.: US 10,500,995 B2
(45) Date of Patent: Dec. 10, 2019

(54) INTERIOR EQUIPMENT

(71) Applicant: TOYOTA BOSHOKU KABUSHIKI KAISHA, Aichi-ken (JP)

(72) Inventor: Hideki Ohtsu, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/025,225

(22) Filed: Jul. 2, 2018

(65) Prior Publication Data

US 2019/0009699 A1 Jan. 10, 2019

(30) Foreign Application Priority Data

Jul. 5, 2017 (JP) .................. 2017-131871

(51) Int. Cl.
*B60N 2/58* (2006.01)
*B68G 7/10* (2006.01)
*B68G 7/052* (2006.01)

(52) U.S. Cl.
CPC ......... *B60N 2/5883* (2013.01); *B60N 2/5858* (2013.01); *B68G 7/052* (2013.01); *B68G 7/10* (2013.01)

(58) Field of Classification Search
CPC .... B60N 2/5883; B60N 2/5858; B68G 7/052; B68G 7/10
USPC ................ 297/218.1–218.5, 452.62
See application file for complete search history.

(56) References Cited

U.S. PATENT DOCUMENTS

| | | | | |
|---|---|---|---|---|
| 5,893,579 A | * | 4/1999 | Kimura | B60N 2/5825 280/728.3 |
| 6,886,479 B1 | * | 5/2005 | Hori | B60N 2/5883 112/470.27 |
| 7,588,290 B2 | * | 9/2009 | Takezawa | B60N 2/5825 297/218.2 |
| 10,227,024 B2 | * | 3/2019 | Kageyama | B60N 2/5883 |

FOREIGN PATENT DOCUMENTS

JP 4432383 3/2010

* cited by examiner

*Primary Examiner* — Syed A Islam
(74) *Attorney, Agent, or Firm* — Greenblum & Bernstein, P.L.C.

(57) ABSTRACT

An interior equipment including: a sewn portion where seam allowances of first and second covers are overlapped in a state where front surface thereof face each other; a regulating member which regulates a falling direction of a leg portion of a piping, wherein the regulating member is attached to a second cover side of the sewn portion and protrudes from an end of the sewn portion, and wherein, in a state of being pressed against a corner portion of a pad member, the regulating member falls toward the first cover together with the leg portion of the piping which is co-sewn to the sewn portion, and thereby a portion of the first cover which is folded back at a seam is arranged to be overlapped with the sewn portion on the corner portion in a state of being raised by a head portion of the piping.

7 Claims, 11 Drawing Sheets

INTERIOR EQUIPMENT

CROSS-REFERENCE TO RELATED APPLICATIONS

This application claims priority from Japanese Patent Application No. 2017-131871 filed on Jul. 5, 2017, the entire contents of which are incorporated herein by reference.

TECHNICAL FIELD

The present disclosure relates to an interior equipment such as a vehicle seat, and particularly to an interior equipment including a pad member forming an outer shape of the interior equipment, first and second covers covering the pad member, and a piping arranged on a back side of the first and second covers.

BACKGROUND

This type of cover is a planar member that constitutes design surfaces of various interior equipment, and seam allowances of adjacent covers are sewn in a state where front surfaces thereof face each other. A piping may be co-sewn and attached by a seam by which the seam allowances of the covers are sewn. The piping includes a cylindrical head portion extending along the seam and a plate-like leg portion integrally, and is co-sewn to the seam in a state of being arranged on a back side of one cover. The cover is arranged on a design surface of a pad member forming an outer shape of the interior equipment, and a portion of the cover covering the piping is arranged along a periphery of the pad member. At this time, the portion of the cover covering the piping is raised by the head portion of the piping, thereby exhibiting an appearance that the periphery of the interior equipment is edged with the portion of the cover.

For example, in a vehicle seat (an example of the interior equipment) disclosed in Japanese Patent No. 4432383, a seat cushion as a seating surface includes a seat pad forming an outer shape of a seat and a seat cover including a piping. The seat pad is a member corresponding to the pad member of the present disclosure, and includes a top plate surface as the seating surface and a frame surface forming a side surface. A corner portion, protruding against the frame surface in a mountain shape, is provided at a periphery of the top plate surface. The seat cover is a planar member corresponding to the cover of the present disclosure, and includes a side cover member covering the top plate surface and a frame cover member covering the frame surface. The seat cover includes a sewn portion where seam allowances of the two cover members are overlapped in a state where front surfaces thereof face each other, and a seam which sews the seam allowances at the sewn portion.

The piping includes the head portion and the leg portion. The head portion is covered with a portion of the cover folded back at the seam of the side cover member, and the leg portion applied to the sewn section is co-sewn by the seam. The piping includes a locking portion provided on an outer surface of the leg portion. The locking portion is a hook or mushroom-like fine protrusion and can be hooked on an inner surface of the side cover member. The portion of the cover folded back at the seam is arranged below the corner portion together with the piping while each cover member is arranged at an appropriate position on the seat pad. In the known technique, the leg portion of the piping co-sewn to the sewn portion is hooked to a back side of the side cover member by the locking portion and falls toward the same. Accordingly, by keeping a falling direction of the leg portion of the piping constant, meandering or breaking of the seam can be avoided, and the portion of the cover folded back at the seam is brought into a state of being raised by the head portion of the piping and is arranged below the corner portion of the top plate surface.

However, in the known technique, the portion of the cover raised by the piping is arranged below the corner portion which is a peripheral of the top plate surface. Therefore, according to the configuration of the known technique, the portion of the cover raised by the piping is arranged to be displaced from the peripheral of the top plate surface, and the configuration of the seat may lack shape reproducibility. In addition, in the known technique, since the leg portion of the piping and the sewn portion fall down only by the locking force of the locking portion, the configuration may be slightly unstable.

SUMMARY

The present disclosure has been made in view of the above points, and a problem to be solved by the present disclosure is to arrange a portion of the cover raised by a piping along an edge of a pad member in a state where a leg portion of the piping falls more stably.

According to an aspect of the disclosure, there is provided an interior equipment including: a pad member which is elastically deformable; a first cover which covers the pad member and includes a seam allowance; a second cover which covers the pad member and includes a seam allowance, the second cover being different from the first cover; a sewn portion where the seam allowances of the first and second covers are overlapped in a state where a front surface of the seam allowance of the first cover and a front surface of the seam allowance of the second cover face each other; a seam which sews the seam allowances at the sewn portion; a piping which is arranged on a back side of the first and second covers, the piping including a columnar head portion extending along the seam and a plate-like leg portion integrated with the head portion, the leg portion being applied to a first cover side of the sewn portion, and the leg portion being co-sewn by the seam in a state where the head portion is arranged on a portion of the first cover which is folded back at the seam; and a regulating member which regulates a falling direction of the leg portion of the piping, wherein the pad member forms at least a part of an outer shape of the interior equipment and includes: a first design surface covered with the first cover; a second design surface covered with the second cover; and a corner portion forming an edge of the first design surface and connected to the second design surface, wherein the regulating member is attached to a second cover side of the sewn portion and protrudes from an end of the sewn portion, and wherein, in a state of being pressed against the corner portion, the regulating member falls toward the first cover together with the leg portion of the piping which is co-sewn to the sewn portion, and thereby the portion of the first cover which is folded back at the seam is arranged to be overlapped with the sewn portion on the corner portion in a state of being raised by the head portion of the piping.

Accordingly, a portion of the first cover raised by the piping can be arranged along the edge of the pad member by overlapping the portion of the cover with the sewn portion on the corner portion. In addition, since the regulating member, for regulating the falling direction of the leg portion of the piping, falls toward the first cover side together with the leg portion of the piping and the sewn portion by using elastic repulsive force from the corner portion, the falling direction of the leg portion of the piping can be kept constant more reliably.

DETAILED DESCRIPTION

Figure 3:
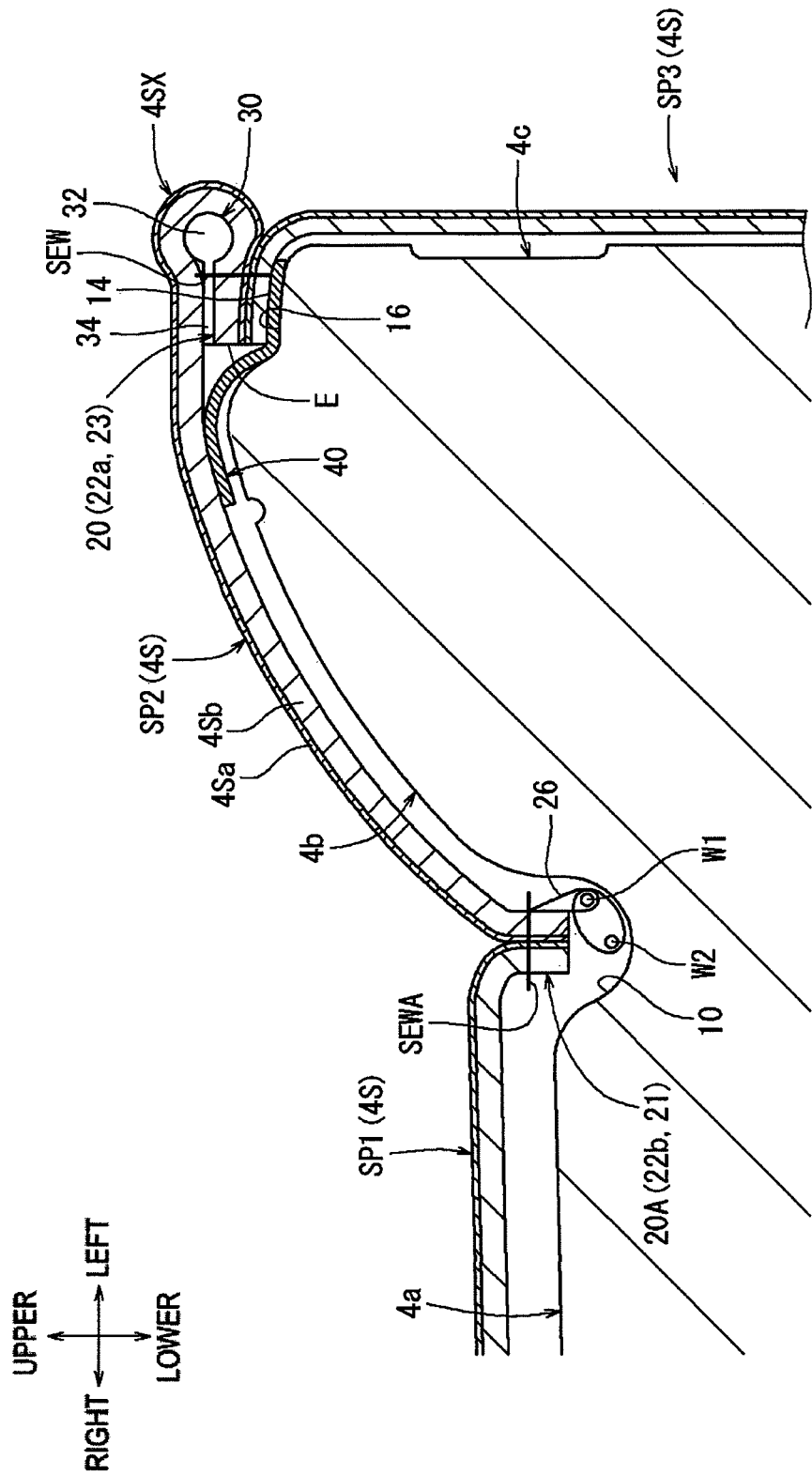
FIG. 3 is an enlarged cross-sectional view of the seat cushion in a circled portion III in FIG. 2.
Figure 4:
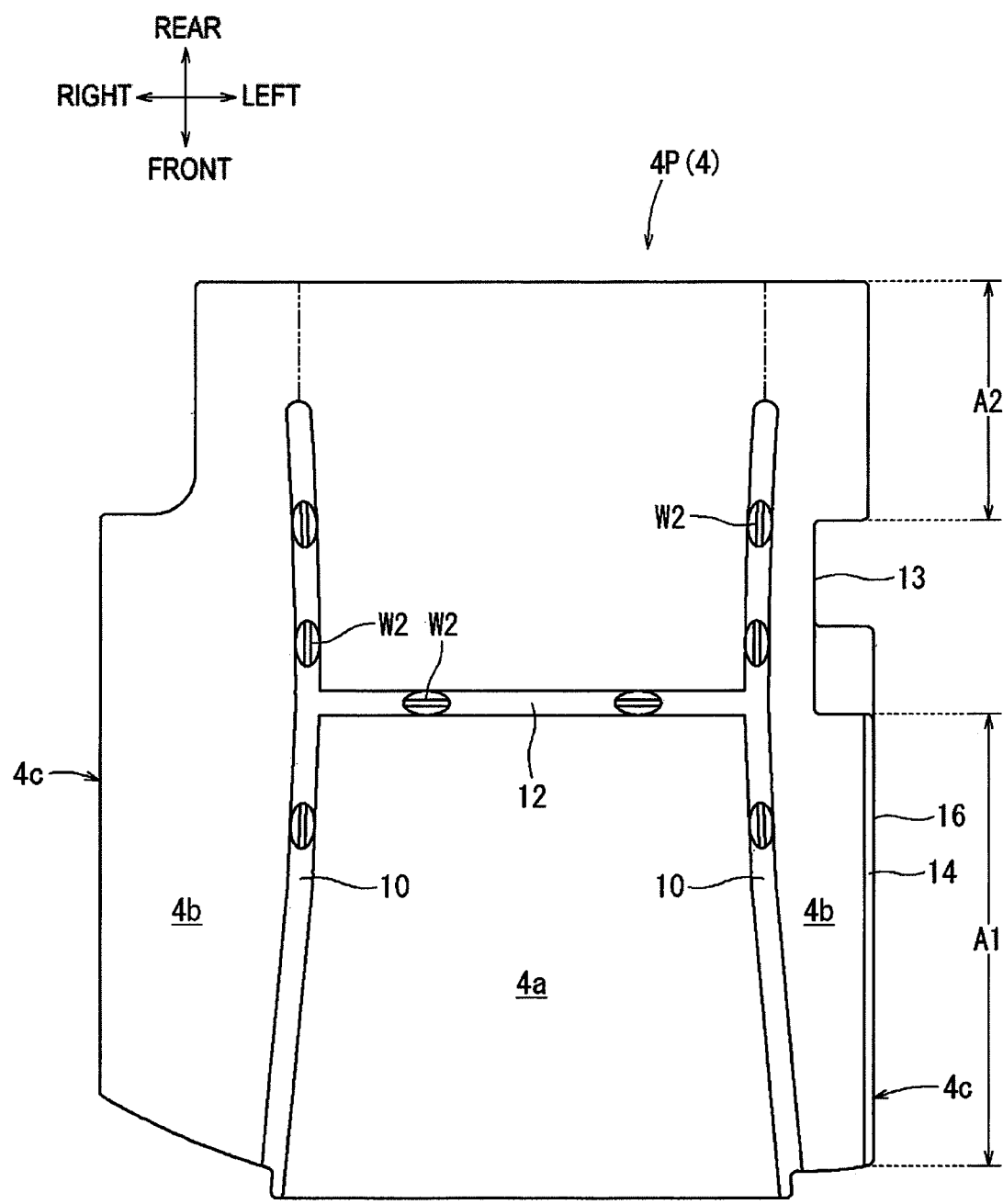
FIG. 4 is a top view of a seat pad.
Figure 5:
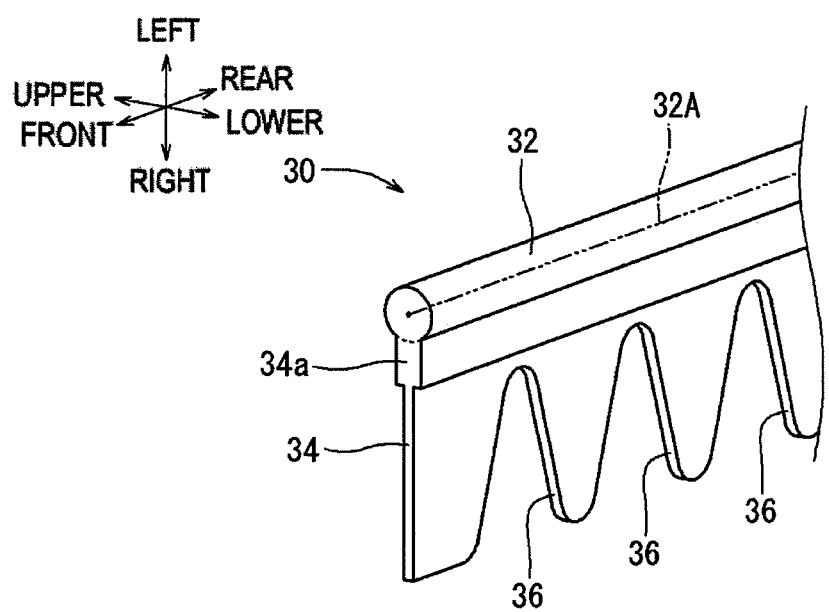
FIG. 5 is a perspective view of a piping.

Hereinafter, embodiments for implementing the present disclosure will be described with reference to FIGS. 1 to 11. In each drawing, arrows indicating a front-rear direction, an upper-lower direction, and a left-right direction of a vehicle seat are appropriately shown. In FIG. 5, arrows indicating a front-rear direction, an upper-lower direction, and a left-right direction of a piping are shown based on a state where the piping is attached to the vehicle seat. In each drawing, a thickness of a seat cover may be exaggerated and a gap may be provided between the seat cover and a seat pad for convenience.

[First Embodiment]

Figure 1:
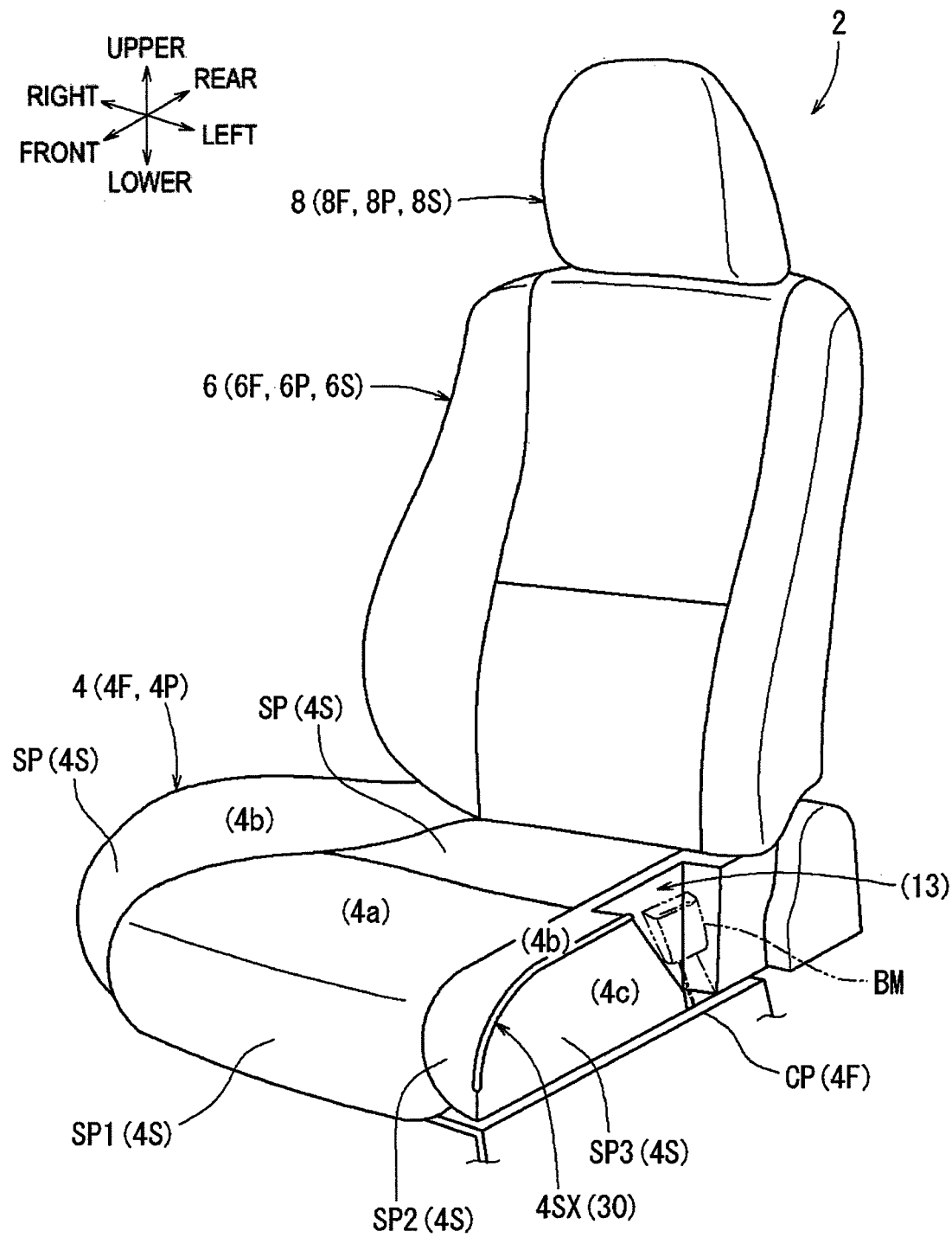
FIG. 1 is a perspective view of a vehicle seat.

A vehicle seat 2 in FIG. 1 is a vehicle interior equipment to be arranged at a third row of a vehicle compartment and includes a seat cushion 4, a seat back 6 and a headrest 8. Each of these seat constituting members (4, 6, 8) includes a seat frame (4F, 6F, 8F) forming a seat framework, a seat pad (4P, 6P, 8P) forming an outer shape of a seat, and a seat cover (4S, 6S, 8S) covering the seat pad. Further, a lower portion of the seat back 6 in a rising state is coupled to a rear portion of the seat cushion 4 (which will be described in detail later) in a manner of being capable of raising and falling. Also, the headrest 8 is arranged on an upper portion of the seat back 6 in the raising state.

[Seat Cushion]

Figure 2:
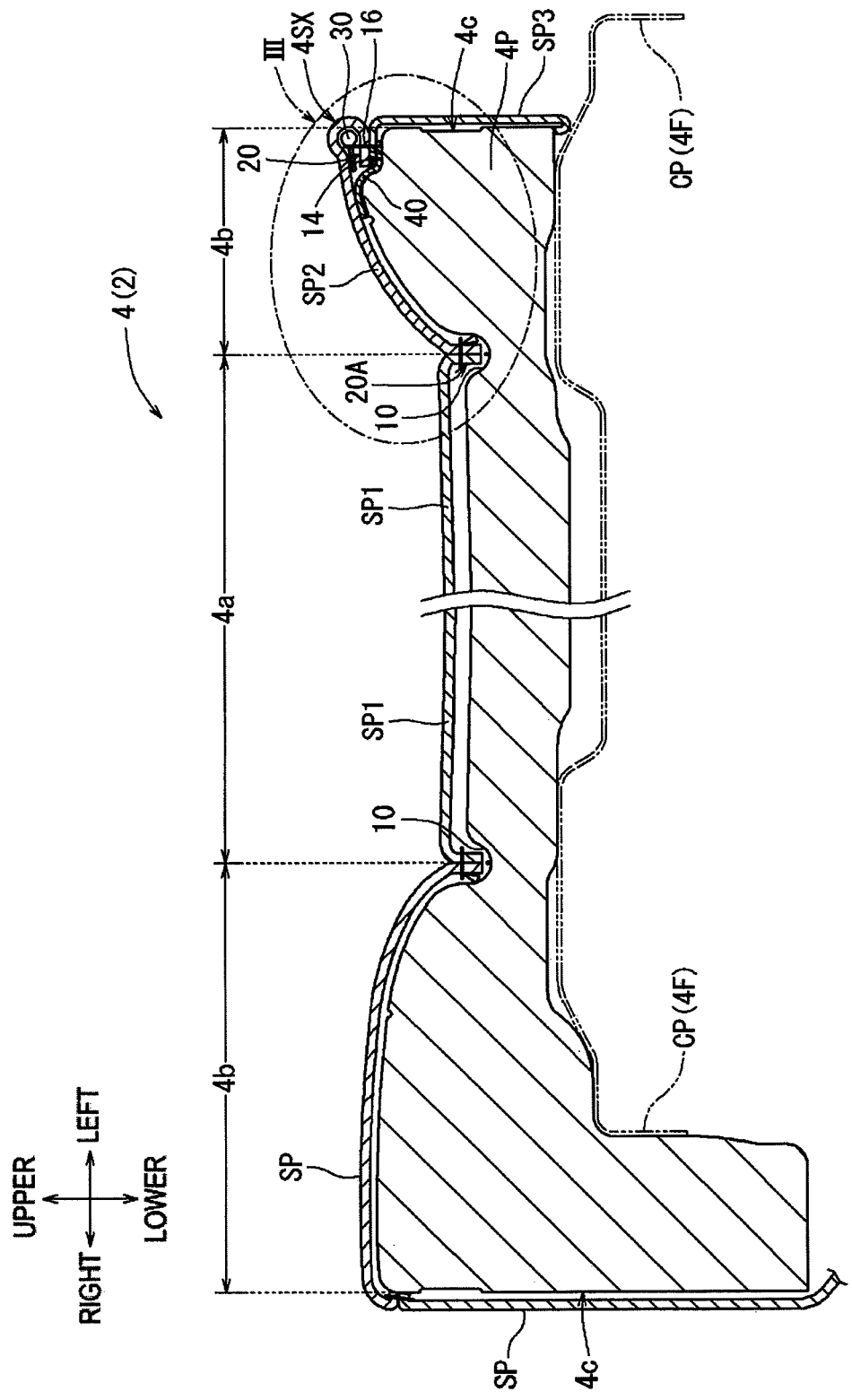
FIG. 2 is a sectional view of a seat cushion.

The seat cushion 4 is a member having a substantially rectangular shape in a top view and an occupant can seat thereon. With reference to FIGS. 1 to 3, the seat cushion 4 includes basic configurations 4F, 4P, 4S, a piping 30, and a regulating member 40 (details of each member will be described later). In the seat cushion 4, the seat pad 4P (which will be described in detail later) is arranged on the seat frame 4F and covered by the seat cover 4S (which will be described in detail later). Herein, the seat frame 4F (not shown) is typically a frame body having a substantially rectangular shape in a top view, and can be made of a material excellent in rigidity, such as metals or hard resins.

A plate-like cushion pan CP is arranged on an upper side of the seat frame 4F, and the cushion pan CP supports the seat pad 4P.

In this embodiment, from a view of improving design of the seat, a seam SEW provided in the seat cover 4S is attached to the piping 30, with reference to FIG. 3. The seat cover 4S is partially raised by a head portion 32 (which will be described later) of the piping 30, and the raised portion (hereinafter, referred to as a cover portion 4SX) is arranged on a left edge of the seat pad 4P (a corner portion 16 which will be described later). In this seat configuration, it is preferable to arrange the cover portion (4SX) along the left edge of the seat pad 4P while avoiding meandering or breaking of the seam SEW, by keeping a falling direction of the leg portion 34 (which will be described later) of the piping 30 constant. Therefore, in this embodiment, due to a later-described configuration, the cover portion 4SX raised by the piping 30 is arranged along the left edge of the seat pad 4P in a state where the leg portion 34 of the piping 30 falls more stably. Hereinafter, each configuration will be described in detail.

[Seat Pad (Pad Member)]

The seat pad 4P is a member having a substantially rectangular shape in a top view and corresponding to the pad member of the present disclosure, and an occupant can be elastically supported thereon. Herein, a material of the seat pad 4P is not particularly limited, and examples can include foamed resins such as foamed polyurethane (density: 10 $kg/m^3$ to 60 $kg/m^3$). With reference to FIGS. 2 to 4, a portion of the seat pad 4P to be a design surface for constituting an appearance thereof can be divided into a main portion 4a, left and right side portions 4b, and left and right frame portions 4c, and a plurality of groove portions 10, 12 are further provided. Herein, the main portion 4a and the left and right side portions 4b are portions corresponding to a seating surface of the present disclosure, and form an upper surface of the seat pad 4P on which the occupant can be seated. The main portion 4a is a substantially flat portion formed at a center in the left-right direction which is a seat width direction, has a width enabling the occupant to be seated thereon and extends in the front-rear direction. In addition, each of the side portions 4b (which will be described in detail later) is a portion protruding upward relatively on a left or right side of the main portion 4a, and can support sides of the occupant, e.g., when the vehicle is cornering. Further, each of the framework portions 4c is a portion forming a right or left side surface of the seat cushion 4 in the seat width direction.

[First Design Surface, Second Design Surface, and Corner Portion]

With reference to FIG. 4, the right side portion 4b is a substantially rectangular portion elongated in the front-rear direction in a top view, and is arranged on the right side of the main portion 4a. In addition, the left side portion 4b is slightly narrower than the right side portion 4b, and is partitioned into a front area A1 and a rear area A2 by a rectangular notch portion 13 provided near a rear portion. As shown in FIG. 1, a member such as a buckle BM can be arranged in the notch portion 13. On the front area A1 shown in FIG. 4, a one-step lower stepped portion 14 is continuously provided along the left edge as shown in FIG. 3. The corner portion 16 forming a bottom surface (preferably a left end of the bottom surface) of the stepped portion 14 is connected to the left frame portion 4c. The corner portion 16 is constituted by the seat pad 4P itself and is elastically deformable. Here, in this embodiment, the front area A1 of the left side portion 4b corresponds to "the first design surface of the pad member" of the present disclosure, and the left frame portion 4c connected to front area A1 corresponds to "the second design surface of the pad member" of the present disclosure.

With reference to FIG. 4, each of the plurality of groove portions (a pair of left and right longitudinal groove portions 10, and a transverse groove portion 12) is a linearly recessed portion provided on a seating surface of the seat pad 4P. In addition, on the seat pad 4P, the groove portions 10, 12 are provided to be approximately an H shape in a top view. The longitudinal groove portions 10 extending along the front-rear direction are each provided between the main portion 4a and the left or right side portion 4b. In addition, the transverse groove portion 12 is provided to traverse the main portion 4a in the left-right direction, and left and right ends of the transverse groove portion 12 are each in communication with a corresponding longitudinal groove portion 10. A fixing wire W2 is arranged on a bottom side of each of the groove portions 10, 12, and a part of the seat cover 4S shown in FIG. 2 (the other sewn portion 20A or the like which will be descried later) can be attached to the fixing wire W2 in a retracted manner.

[Surface Member and Elastic Member]

Figure 6:
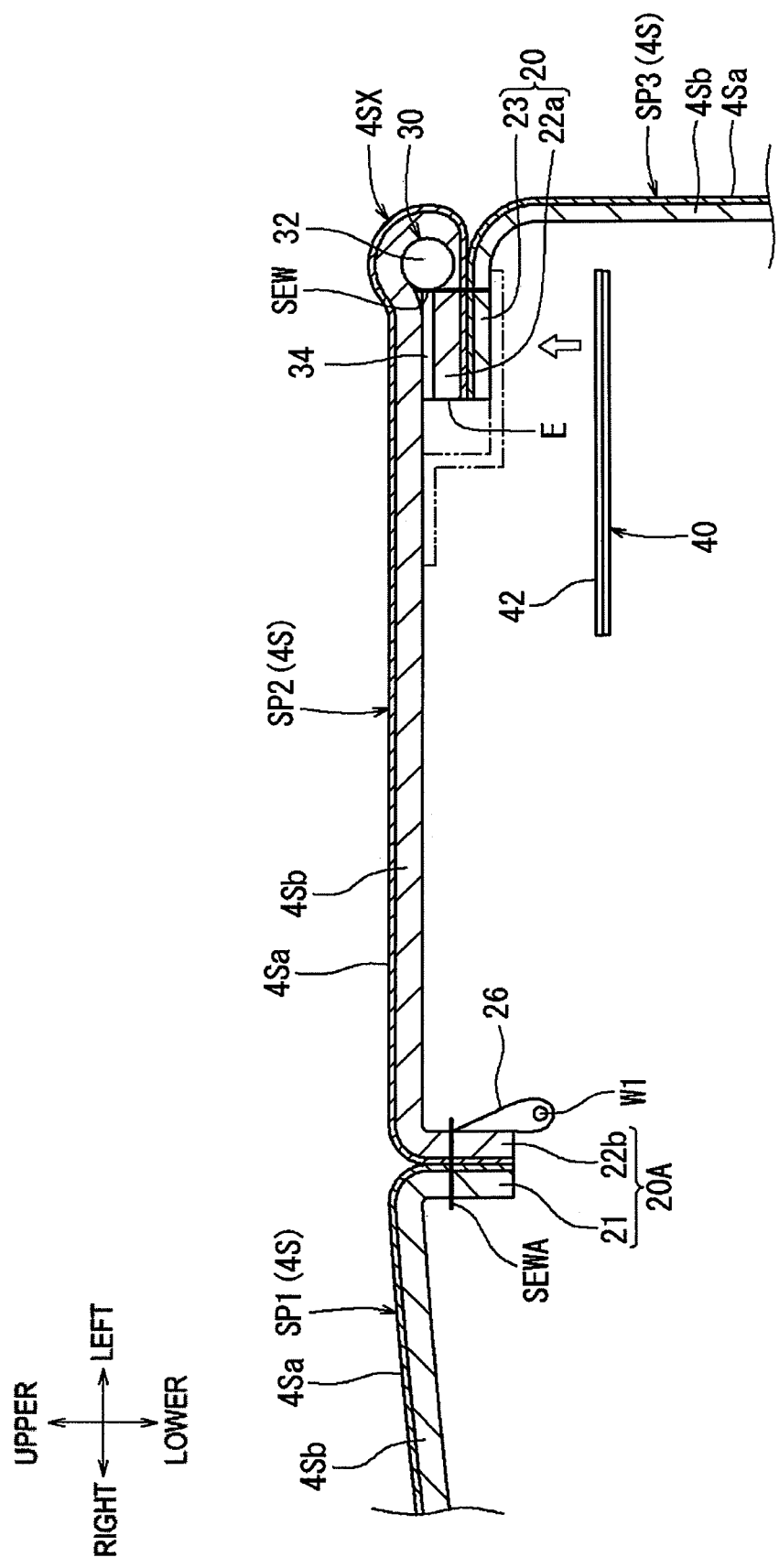
FIG. 6 is partially exploded sectional view of a seat cover corresponding to the portion shown in FIG. 3.

Herein, with reference to FIGS. 3 and 6, each cover piece SP1 to SP3 includes a surface member 4Sa forming an outer surface exposed outside and an elastic member 4Sb laminated on a back side of the surface member 4Sa (in FIG. 3, only the surface member and the elastic member of a second cover piece are denoted with reference number for convenience). As a material of the surface member 4Sa, for example, cloth (woven fabric, knitted fabric, and nonwoven fabric) or leather (natural leather and synthetic leather) can be used, and the surface member 4Sa made of synthetic leather is used in this embodiment. In addition, as a material of the elastic member 4Sb, elastically deformable foamed resins such as a urethane lamination can be used. The surface member 4Sa and the elastic member 4Sb can be integrally laminated by a method such as flame lamination. Although the surface member 4Sa may become hard due to shrinkage (sink) caused by heating, the hardness of the surface member 4Sa can be complemented by the elastic force of the elastic member 4Sb since the elastic member 4Sb on the back side has appropriate elasticity.

[Sewn Portion and Seam]

Adjacent cover pieces are sewn to each other at a sewn portion where seam allowances are overlapped in a state where front surfaces thereof face each other. Herein, since a sewing method for each cover piece is substantially the same, the sewing method for the second cover piece SP2 and the third cover piece SP3 which are shown in FIG. 6 will be described below as an example. Namely, the second cover piece SP2 is provided with a left seam allowance 22a formed along a left edge thereof, and the left seam allowance 22a corresponds to a first seam allowance of the present disclosure. In addition, the third cover piece SP3 is provided with an upper seam allowance 23 formed along an upper edge thereof. Then, when these cover pieces are sewn, seam allowances of the second cover piece SP2 and the third cover piece SP3 are overlapped in a state where front surfaces thereof face each other, so as to form a sewn portion 20, on which a seam SEW for seaming the seam allowances is formed. The seam SEW extends in the front-rear direction between the second cover piece SP2 and the third cover piece SP3, and is co-sewn and attached to the piping 30 (which will be described later).

Here, the second cover piece SP2 in this embodiment is provided with a right seam allowance 22b formed along a right edge thereof, and the right seam allowance 22b corresponds to a second seam allowance of the present disclosure. The other sewn portion 20A is formed by the right seam allowance 22b of the second cover piece SP2 and a main side seam allowance 21 provided along a right edge of the first cover piece SP1. Other seams SEWA for sewing corresponding seam allowances and a suspended cloth 26 are attached to the other sewn portion 20A. A suspended wire W1 is inserted through the suspended cloth 26. In a covering operation of the seat cover 4S, as shown in FIG. 3, the suspended wire W1 of the suspended cloth 26 can be stopped, by a hook ring, on a fixing wire W2 in the longitudinal groove portion 10 while pulling the other sewn portion 20A together with the suspended cloth 26 into the longitudinal groove portion 10.

[Piping]

As shown in FIG. 3, the piping 30 is a member arranged on a back side of the second cover piece SP2, and includes the head portion 32 and the leg portion 34 integrally. With reference to FIGS. 3 and 5, the head portion 32 is a columnar portion extending in the front-rear direction along the seam SEW, and is a portion contributing to raising of the second cover piece solely. In addition, the leg portion 34 is a plate-like portion extending from the head portion 32, and is a portion co-sewn to the seam SEW in a state of being applied to the sewn portion 20, as shown in FIG. 3. In the leg portion 34, a root portion 34a integrated with the head portion 32 is relatively thick, and a portion from the root portion 34a to an end thereof is relatively thin. In the leg portion 34, a plurality of separated portions 36 are provided at an appropriate interval in a direction of an axis 32A of the head portion 32. Each of the separated portions 36 is a notch having a substantially triangular shape in a side view extending upward from a lower end of the leg portion 34, and a vertex side thereof is arranged at a position coinciding with a lower end of the root portion 34a. When the piping 30 is bent toward an appropriate direction, a perimeter difference generated at the leg portion 34 can be absorbed by a corresponding separated portion 36. Therefore, the leg portion 34 can be arranged along the seam SEW while being bent toward an appropriate direction, and thus a configuration contributing to improving usability of the piping 30 is obtained.

Herein, a material of the piping 30 may be any material as long as a sewing needle (not shown) can pierce therethrough, and desirably the material has appropriate flexibility. Examples of the material can include resins, elastomers (soft resins) and rubbers. In addition, examples of resins can include vinyl chloride resins, acrylic resins, silicone resins, polyamide resins, fluoro resins, and polyurethane resins. Examples of elastomers can include silicone elastomers, acrylic elastomers, polyurethane elastomers, polyester elastomers, styrene elastomers, and olefin elastomers. Examples of rubbers can include acrylic rubbers, silicone rubbers, and natural rubbers.

In this embodiment, when the second cover piece SP2 and the third cover piece SP3 are sewn, the piping 30 can be attached to the back side of the second cover piece SP2. Namely, with reference to FIGS. 3 and 6, when the two cover pieces SP2, SP3 are arranged in a state where front surfaces thereof face each other, the leg portion 34 of the piping 30 is applied to the back side of the second cover piece SP2. In addition, by sewing the seam allowances 22a, 23 of the two cover pieces together with the leg portion 34 (the root portion 34a) of the piping 30, the leg portion 34 of the piping 30 can be co-sewn by a seam SEW while forming the seam SEW on the sewn portion 20. Further, by folding back the second cover piece SP2 at the seam SEW, the head portion 32 can be arranged on a back side of the folded portion of the second cover piece SP2. When covering the seat cover 4S (which will be described later), the folded portion of the second cover piece SP2 is brought into a state of being raised by the head portion 32 arranged on the back side thereof, thereby configuring the raised cover portion 4SX.

[Regulating Member]

With reference to FIG. 3, the regulating member 40 is a member for regulating a falling direction of the leg portion 34 of the piping 30, and is attached to the sewn portion 20 and protrudes from an end E of the sewn portion 20. The regulating member 40 is a belt-like planar member having appropriate flexibility and can be arranged along the sewn portion 20. With reference to FIG. 6, the regulating member 40 includes an adhesive portion 42 that solidifies after melting caused by heating, and can be adhered and fixed to a back side of a corresponding cover piece. Herein, as a material of the regulating member 40 (the main body), materials exemplified for the surface member 4Sa or the piping 30 can be used. As the adhesive portion 42, organic adhesive components such as thermoplastic resins or thermosetting resins, or inorganic adhesive components such as silicon-base or calcium-based components can be used. In addition, the regulating member 40 of this embodiment is a belt member made of polyurethane resins, and includes a polyurethane-based hot-melt type adhesive portion 42. As shown in FIG. 6, a right side of the regulating member 40 protrudes from the end E of the sewn portion 20 while a left end portion of the regulating member 40 is adhered and attached to a third cover piece side of the sewn portion 20. A right end portion of the regulating member 40 is adhered and fixed to the back side of the second cover piece SP2 while the leg portion 34 of the piping 30 and the sewn portion 20 fall to a second cover piece side by the regulating member 40. In this manner, the falling direction of the leg portion 34 of the piping 30 can be kept constant more reliably by adhering and fixing the regulating member 40 to an appropriate position of each of the cover pieces (by attaching the regulating member 40 through a simpler method).

[Covering Operation of Seat Pad by Seat Cover]

With reference to FIGS. 1 to 3, the seat pad 4P is arranged on the seat frame 4F and covered by the seat cover 4S. As shown in FIG. 3, the first cover piece SP1 covers a front part of the main portion 4a, the second cover piece SP2 covers the left side portion 4b, and the third cover piece SP3 covers the left frame portion 4c. In addition, in this embodiment, the folded portion (the cover portion 4SX) of the second cover piece SP2 is brought into a state of being raised by the head portion 32 of the piping 30, and is arranged along the corner portion 16 provided on a left edge of the left side portion 4b. In this configuration, it is preferable to arrange the raised cover portion 4SX along the left edge of the side portion 4b of the seat pad 4P in a state where the leg portion 34 of the piping 30 falls more stably.

Therefore, in this embodiment, with reference to FIG. 3, the regulating member 40 for regulating the falling direction of the leg portion 34 of the piping 30 is attached to the third cover piece side of the sewn portion 20 and protrudes from the end E of the sewn portion 20. The regulating member 40 is brought into a state of being pressed against the corner portion 16 and falls toward the second cover piece SP2 together with the sewn portion 20 and the leg portion 34 of the piping 30. In addition, the folded portion (the cover portion 4SX) of the second cover piece SP2 is arranged to be overlapped with the sewn portion 20 on the corner portion 16 in a state of being raised by the head portion 32 of the piping 30.

Namely, in this embodiment, the sewn portion 20 is arranged on the stepped portion 14 provided on the left edge of the side portion 4b while the left side portion 4b and the frame portion 4c are covered by the second cover piece SP2 and the third cover piece SP3. From a point view of arranging the seat cover 4S in a good appearance, the seat cover 4S is brought into a state where each of the cover pieces SP2, SP3 is appropriately stretched by applying tension to a surface direction thereof. Accordingly, the regulating member 40 on a back side of the sewn portion 20 is brought into a state of being relatively strongly pressed, from an upper side, against the corner portion 16 forming the left edge of the side portion 4b. In addition, the regulating member 40 is biased so as to fall toward the second cover piece side by elastic repulsive force from the corner portion 16. In this manner, the regulating member 40 falls toward the second cover piece side together with the leg portion 34 and the sewn portion 20 by using the elastic repulsive force from the corner portion 16, and thereby the falling direction of the leg portion 34 of the piping 30 can be kept constant more reliably. In addition, by making the leg portion 34 fall toward the second cover piece side, the folded portion (the cover portion 4SX) of the second cover piece SP2 is arranged to be overlapped with the sewn portion 20 on the corner portion 16 in the state of being raised by the head portion 32 of the piping 30.

With reference to FIGS. 1 to 3, the cover portion 4SX raised by the piping 30 is arranged along the left edge of the side portion 4b, thereby exhibiting an appearance that the left edge of the seat cushion 4 is edged with the cover portion 4SX. Particularly in this embodiment, a configuration contributing to design improvement of the seat is obtained by edging a left edge front end of the side portion 4b forming the seating surface, which is a relatively conspicuous portion, with the raised cover portion 4SX. Further, the regulating member 40 is configured by a planar member having flexibility and a thickness thereof may be obtained as necessary. Therefore, in this embodiment, a problem that the regulating member 40 projects from the seat cover 4S (highlights occur) can be suitably avoided.

As described above, in this embodiment, the cover portion 4SX raised by the piping 30 can be arranged along the edge of the seat pad 4P by being overlapped with the sewn portion 20 on the corner portion 16. Particularly, in the present disclosure, a configuration contributing to the design improvement of the seat is obtained by arranging the cover portion 4SX raised by the piping 30 on the edge of the relatively conspicuous side portion 4b (the seating surface). In addition, since the regulating member 40 falls toward the second cover piece side together with the leg portion 34 of the piping 30 and the sewn portion 20 by using the elastic repulsive force from the corner portion 16, the falling direction of the leg portion 34 of the piping 30 can be kept constant more reliably. In addition, in this embodiment, the regulating member 40 is configured by a planar member having flexibility, and thereby a problem that the seat cover 4S raises due to this regulating member 40 (the regulating member projects from the seat cover) can be avoided well. Due to a relatively simple configuration in which both end sides of the regulating member 40 are adhered and fixed to appropriate positions of the seat cover 4S, the falling direction of the leg portion 34 of the piping 30 can be kept constant more reliably. In this embodiment, due to the surface member 4Sa made of synthetic leather and forming the outer surface, the vehicle seat 2 exhibits an appearance with high quality. Further, even if the surface member 4Sa made of synthetic leather becomes hard due to shrinkage (sink) caused by heating, the hardness thereof can be complemented by the elastic force of the elastic member 4Sb. Therefore, according to this embodiment, the cover portion 4SX raised by the piping 30 can be arranged along the edge of the seat pad 4P in the state where the leg portion 34 of the piping 30 falls more stably.

[First Modification]

Figure 7:
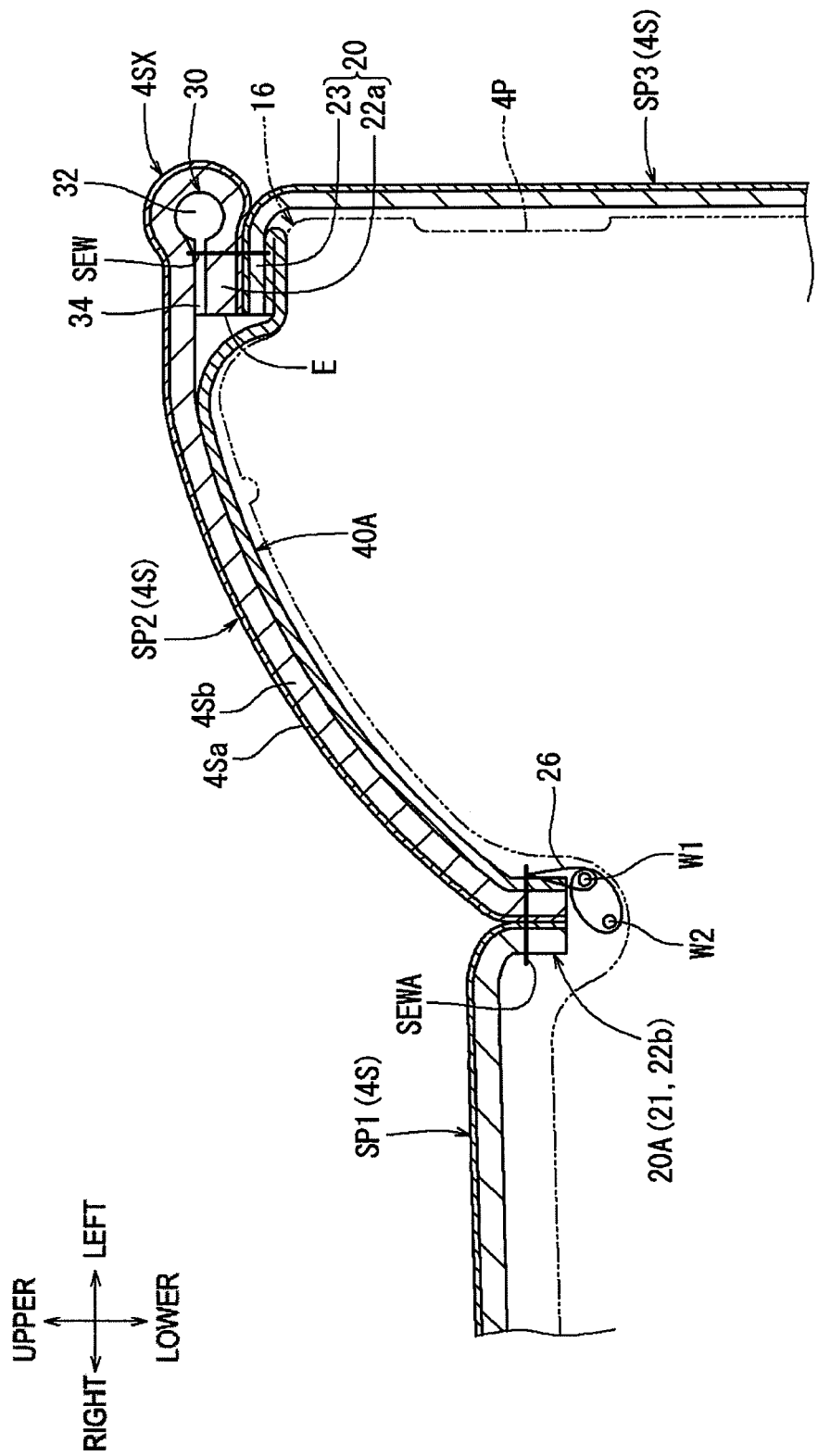
FIG. 7 is an enlarged cross-sectional view of a seat cushion according to a first modification.

Herein, various configurations can be adopted as the fixing method of the regulating member in addition to the adhering and fixing method described above. For example, a regulating member 40A of a first modification shown in FIG. 7 is a planar member having a width capable of traversing the second cover piece SP2 in the left-right direction, and is same as the regulating member in the first embodiment except that the adhesive portion 42 is not included. In this modification, a right side of the regulating member 40A protrudes from the end E of the sewn portion 20 while a left end portion of the regulating member 40A is co-sewn by and attached to the seam SEW of the sewn portion 20. While the regulating member 40A is arranged so as to be applied to the back side of the second cover piece SP2, aright end portion of the regulating member 40A is co-sewn and fixed to a right seam allowance 22b side (left or right of the other sewn portion 20A). In this manner, in this modification, both end sides of the regulating member 40A are sewn and relatively strongly attached to the seam allowances 22a, 22b corresponding to the seat cover 4S, and thereby the falling direction of the leg portion 34 of the piping 30 can be kept constant more reliably. In addition, through the suspended wire W1 of the suspended cloth 26, the other sewn portion 20A is stopped, by a hook ring, on the fixing wire W2 in the longitudinal groove portion 10. Therefore, even if the regulating member 40A is pulled to the left, the regulating member 40A can return to the original proper position since the right end portion of the regulating member 40A is firmly fixed at the other sewn portion 20.

[Second Embodiment]

Figure 8:
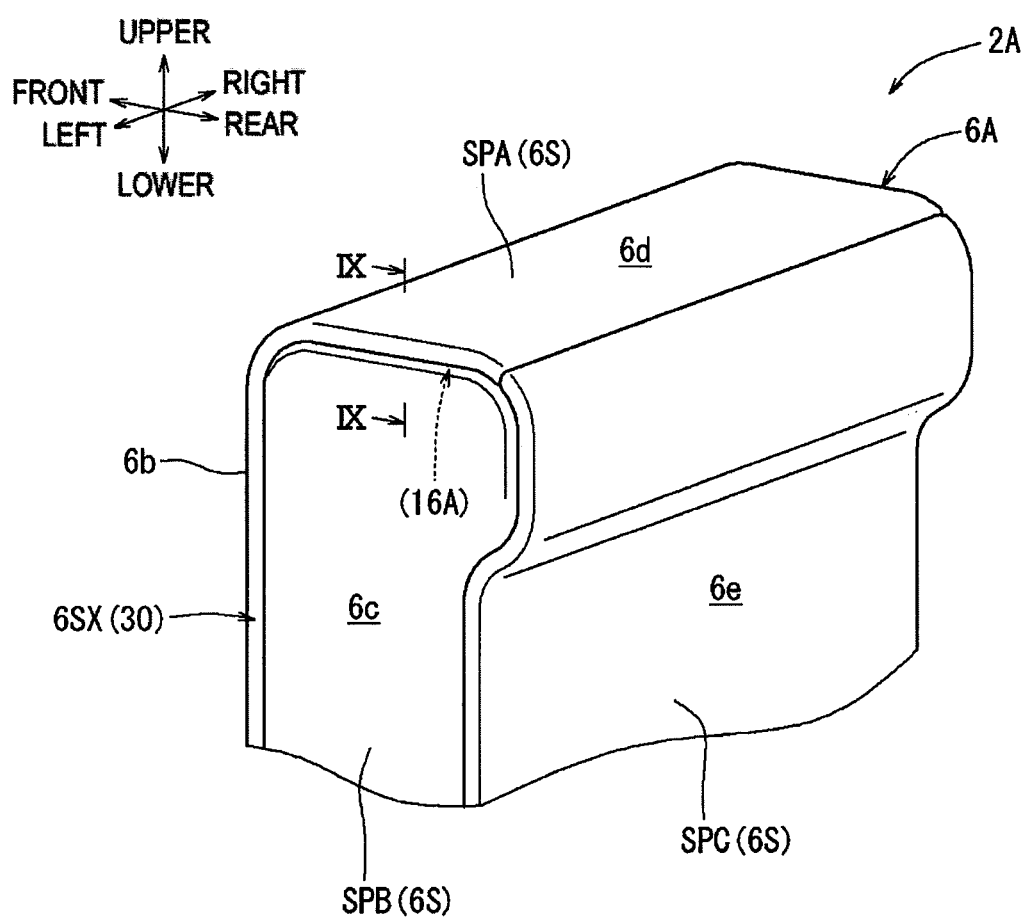
FIG. 8 is a perspective view of a part of a seat back according to a second embodiment.
Figure 9:
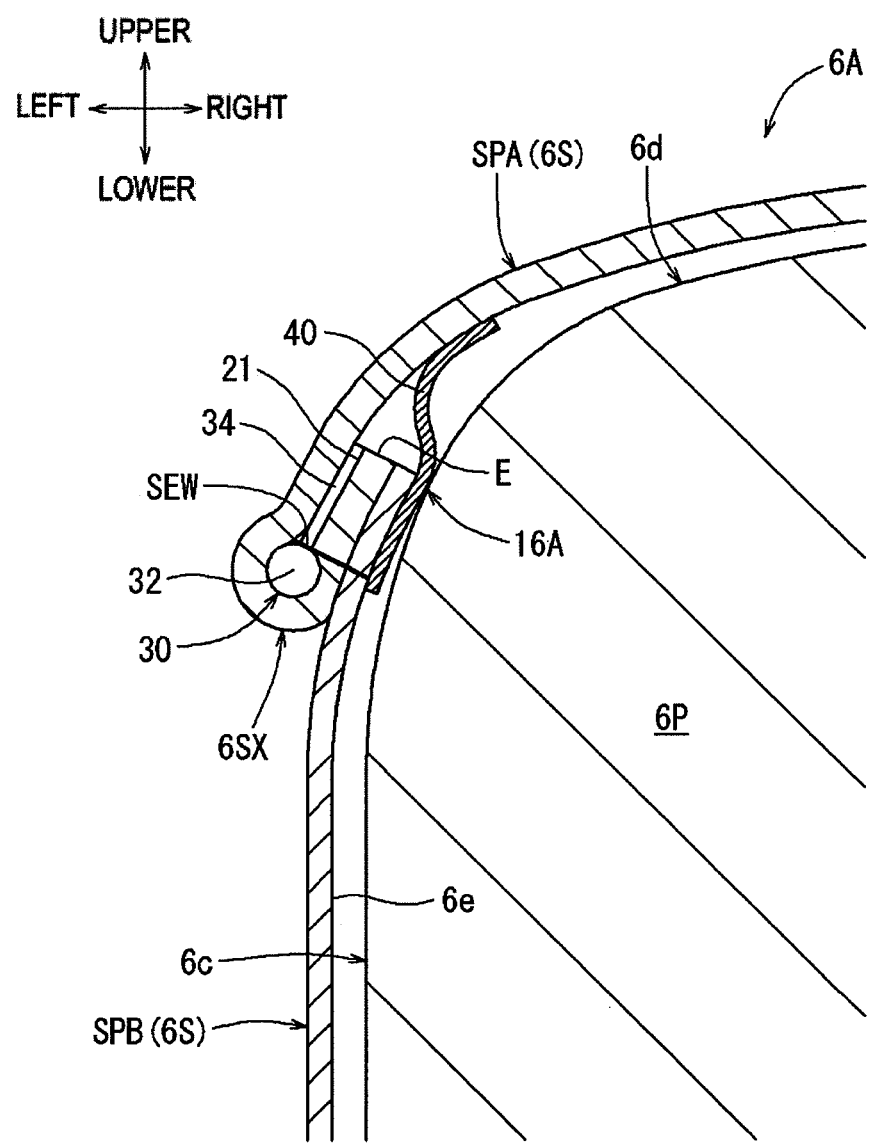
FIG. 9 is a sectional view of the part of the seat back according to the second embodiment.

In a vehicle seat 2A of a second embodiment, components having substantially the same basic configuration as the vehicle seat of the first embodiment are denoted by the same reference numerals and detailed description thereof is omitted. The vehicle seat 2A of the second embodiment is different from the vehicle seat of the first embodiment in that a seat back 6A forming a backrest as shown in FIG. 8 includes a cover portion 6SX raised by the piping 30. The seat back 6A has the same outer shape and basic configuration as those of the seat back 6 of the first embodiment as shown in FIG. 1. In addition, a seat pad (not shown) of the seat back 6A is provided with a side portion 6b, an upper surface portion 6d and a rear surface portion 6e which form a design surface, and a left frame portion 6c forming the other design surface. Further, the side portion 6b, the upper surface portion 6d and the rear surface portion 6e are continuously provided with a corner portion 16A forming left edges of the above portions so as to form substantially an inverted U shape. In addition, the corner portion 16A is connected to the frame portion 6c. With reference to FIG. 9, the corner portion 16A is a convex curved portion forming the left edge of the upper surface portion 6d or the like, and is connected to the left frame portion 6c located adjacently.

With reference to FIGS. 8 and 9, the seat cover 6S includes a first cover piece SPA covering the side portion 6b and the upper surface portion 6d, a second cover piece SPB covering the frame portion 6c, a third cover piece SPC covering the rear surface portion 6e, the piping 30, and the regulating member 40. In this embodiment, the first cover piece SPA and the third cover piece SPC correspond to the "first cover" of the present disclosure, and the second cover piece SPB corresponds to the "second cover" of the present disclosure. Herein, since the first cover piece SPA and the third cover piece SPC have the substantially same basic configuration, details of the first cover piece SPA and the second cover piece SPB will be described as an example.

With reference to FIG. 9, the first cover piece SPA and the second cover piece SPB are sewn by the same method as in the first embodiment, and include a sewn portion 21 where seam allowances are overlapped in a state where front surfaces thereof face each other, and a seam SEW where the seam allowances are seamed. Further, the piping 30 is arranged on a back side of the first cover piece SPA. Namely, the head portion 32 of the piping 30 is arranged on a back side of the second cover piece SPB folded back at the seam SEW, and the leg portion 34 of the piping 30 is co-sewn to a first cover piece SPA side of the sewn portion 21. In addition, the regulating member 40 has the same configuration as the regulating member of the first embodiment. A lower end portion of the regulating member 40 is attached to a second cover piece SPB side of the sewn portion 21, and an upper side of the regulating member 40 protrudes from an end E of the sewn portion 21.

In addition, in this embodiment, as shown in FIG. 8, the cover portion 6SX raised by the piping 30 is arranged on the left edges of the side portion 6b, the upper surface portion 6d and the rear surface portion 6e so as to form an inverted U shape. For example, with reference to FIG. 9, the first cover piece SPA and the second cover piece SPB cover the upper surface portion 6d and the left frame portion 6c, respectively. The sewn portion 21, where the seam allowances of the first cover piece SPA and the second cover piece SPB are overlapped, is arranged at the corner portion 16A forming a left end of the upper surface portion 6d. From a point view of arranging the seat cover 6S in a good appearance, the seat cover 6S is brought into a state where each of the cover pieces SPA, SPC is appropriately stretched by applying tension to a surface direction thereof. Accordingly, the regulating member 40 on a back side of the sewn portion 21 is brought into a state of being relatively strongly pressed against the corner portion 16A forming a left edge of the upper surface portion 6d. In addition, the regulating member 40 is biased so as to fall toward the first cover piece SPA side by elastic repulsive force from the corner portion 16A. In this manner, the regulating member 40 falls toward the first cover piece SPA side together with the leg portion 34 and the sewn portion 21 by using the elastic repulsive force from the corner portion 16A, and thereby the falling direction of the leg portion 34 of the piping 30 can be kept constant more reliably. In addition, by making the leg portion 34 fall to the first cover piece SPA side, the folded portion (the cover portion 6SX) of the first cover piece SPA is arranged to be overlapped with the sewn portion 21 above the corner portion 16A in the state of being raised by the head portion 32 of the piping 30. Therefore, in this embodiment, the cover portion 6SX raised by the piping 30 can also be arranged along an edge of the seat pad 6P in the state where the leg portion 34 of the piping 30 falls more stably.

[Second Modification]

Figure 10:
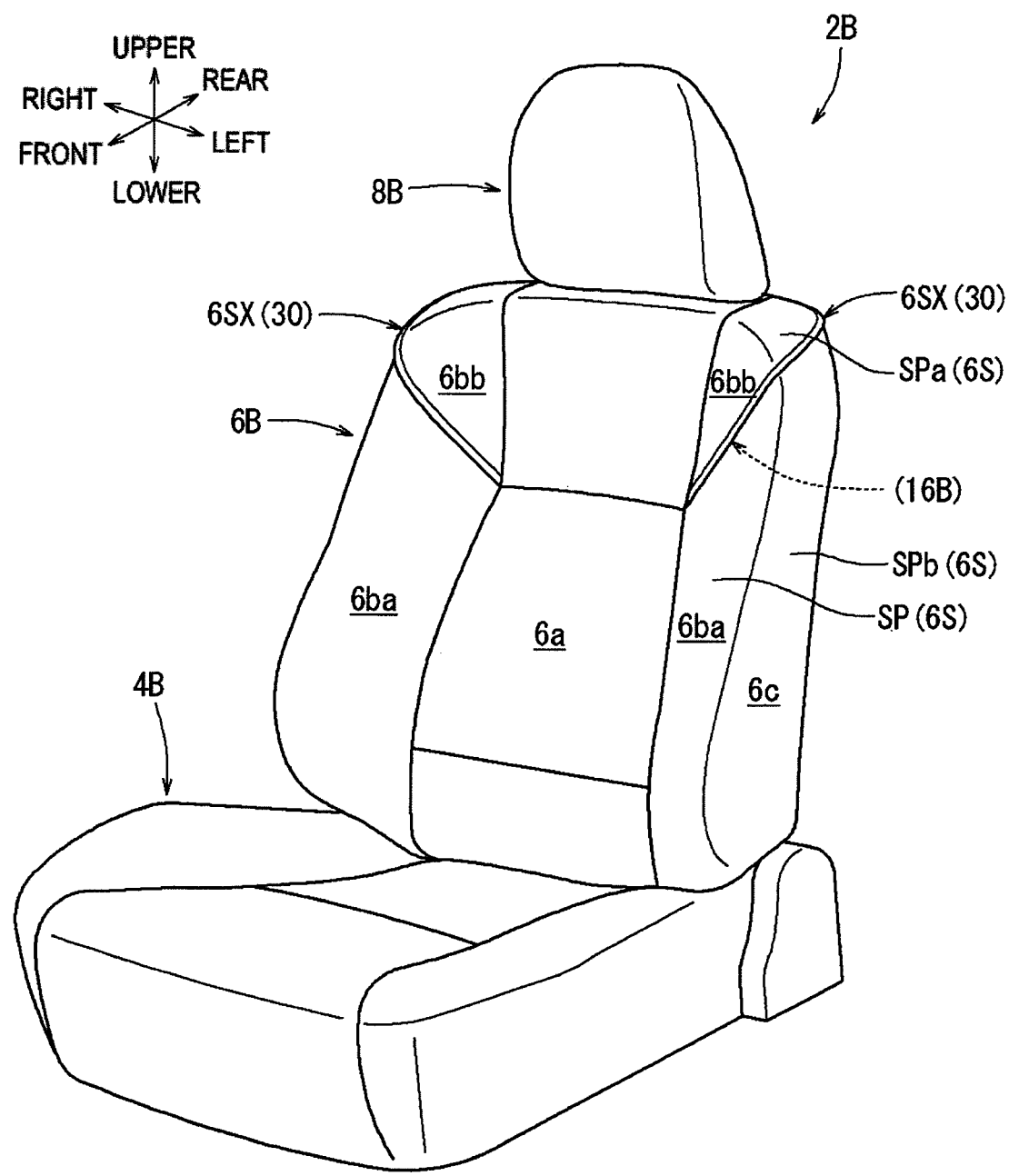
FIG. 10 is a perspective view of a vehicle seat according to a second modification.
Figure 11:
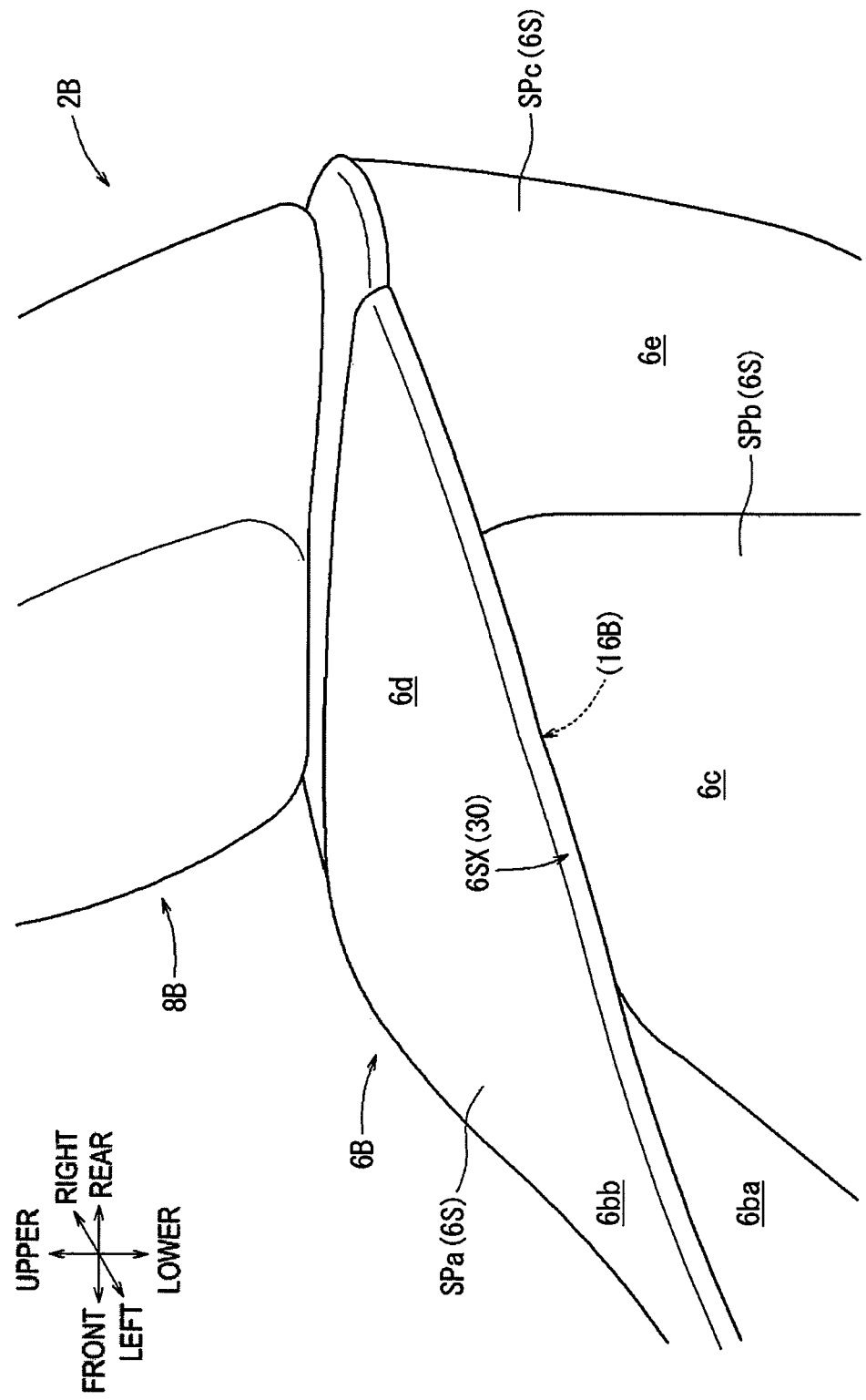
FIG. 11 is a perspective view of a part of a seat back according to the second modification.

Herein, a position of "the portion of the cover raised by the piping" can be set to an appropriate position, such as on the seat back, in addition to the above-mentioned position. For example, a vehicle seat 2B of a second modification, as shown in FIGS. 10 and 11, includes a seat cushion 4B, a seat back 6B, and a headrest 8B, and basic configurations of these seat configuration members are substantially the same as the corresponding members of the first or second embodiment. Herein, in the seat back 6B, left and right side portions are divided into upper and lower portions from the view of design improvement. A lower end of an upper portion 6bb of the side portion is gradually inclined upward from right to left and is connected to an upper portion of a lower portion 6ba of the side portion. This modification is different from the second embodiment in that the cover portion 6SX raised by the piping 30 is arranged across the left end and a rear end of the upper surface portion 6d while traversing the side portions (6ba, 6bb) of the seat back 6 in the left-right direction.

Namely, in this modification, with reference to FIG. 11, a seat pad (not shown) of the seat back 6B is provided with the upper portion 6bb of the side portion and the upper surface portion 6d which form a design surface, and the lower portion 6ba of the side portion, the rear surface portion 6e and the left frame portion 6c which form another design surface. Further, a lower edge of the upper portion 6bb of the side portion and a left edge and a rear edge of the upper surface portion 6d are continuously provided with a corner portion 16B. The corner portion 16B has substantially the same basic configuration as the corner portion 16A of the second embodiment shown in FIG. 9.

With reference to FIGS. 10 and 11, the seat cover 6S includes a first cover piece SPa covering the upper portion 6bb of the side portion and the upper surface portion 6d. The first cover piece SPa is adjacent to a cover piece SP covering the lower portion 6ba of the side portion, a second cover piece SPb covering the frame portion 6c, and a third cover piece SPc covering the rear surface portion 6e. In addition, the first cover piece SPa corresponds to the "first cover" of the present disclosure, and other cover pieces SPb, SPc, SP correspond to the "second cover" of the present disclosure. Further, the cover portion 6SX raised by the piping 30 in this modification has configurations (the sewn portion, the seam, the piping, and the regulating member) substantially the same as the corresponding configurations of the second embodiment. In this modification, the cover portion 6SX raised by the piping 30 is arranged across the left end and the rear end of the upper surface portion 6d while traversing the side portions (6ba, 6bb) at a side of the seating surface in the left-right direction. Therefore, due to the cover portion 6SX raised by the piping 30, the divided portions of the side portion can be emphasized and the design of the vehicle seat 2B can be further improved.

The interior equipment according to this embodiment is not limited to those in the above-described embodiments, and various other embodiments can be adopted. In this embodiment, although the configurations (e.g., a shape, a dimension, constitutional portions) of the piping 30 and the regulating member 40 are exemplified, the configuration of each of these members is not limited. For example, the head portion of the piping can take various shapes such as a prismatic shape (including a plate shape or the like) in addition the columnar shape. The leg portion of the piping can take various shapes that can be applied to the sewn portion. In addition to the case of attaching to the sewn portion by sewing, adhesion or fusing, the regulating member can be attached by a staple, a clip or the like. Further, an end of a protruding side of the regulating member can be attached to an appropriate position of the corresponding cover by an appropriate method and can be kept not to be attached to the cover if the falling state can be maintained.

In addition, the regulating member can be made of a resin sheet material or a mat material as long as the material has appropriate flexibility.

In this embodiment, although the configurations (e.g., a shape and a dimension) of the seat pad as the pad member and the cover piece as the cover are exemplified, the configuration of each of these members is not limited. For example, the first design surface and the second design surface of the pad member can be set at appropriate positions on the seating surface of the vehicle seat (the interior equipment), and can be set on a surface different from the seating surface. In addition, the pad member can be a seat pad which forms the entire outer shape of the vehicle seat, or can form a part of the outer shape of the interior equipment. In addition to the stepped shape (bent shape) of the first embodiment or the curved shape of the second embodiment, the corner portion can take various shapes such as a protruding shape like eaves in the known technique. Further, the configuration of the cover can also be appropriately changed according to the configuration of the pad member.

Also in this embodiment, although the vehicle seat 2 or the like is exemplified as the interior equipment, the configuration of the vehicle seat can be appropriately changed. For example, in this embodiment, although a vehicle seat for a single person arranged in a third row in the vehicle compartment is exemplified, the vehicle seat may be arranged in the first row or the second row and may be used for one person or a plurality of persons. The configuration of this embodiment can be suitably used for a vehicle interior equipment arranged in a vehicle compartment or an interior equipment arranged in a house (e.g., a household interior equipment). Further, the configuration of the cover or the pad member can be appropriately changed according to the type of interior equipment to be used. As the vehicle interior equipment, interior equipment to be mounted on vehicles such as a vehicle, an aircraft and a train can be assumed, and in addition to the vehicle seat, interior trims such as a door trim, and various members such as an instrument panel, a ceiling portion, or a console can be exemplified. In the vehicle seat, the configuration according to this embodiment can be applied to various seat constituting members such as a headrest and an armrest, in addition to the seat cushion and the seat back. Incidentally, the configurations of the embodiments and the modifications can be used in combination as appropriate, if possible.

The disclosure provides illustrative, non-limiting examples as follows:

According to a first aspect of the disclosure, there is provided an interior equipment including: a pad member which is elastically deformable; a first cover which covers the pad member and includes a seam allowance; a second cover which covers the pad member and includes a seam allowance, the second cover being different from the first cover; a sewn portion where the seam allowances of the first and second covers are overlapped in a state where a front surface of the seam allowance of the first cover and a front surface of the seam allowance of the second cover face each other; a seam which sews the seam allowances at the sewn portion; a piping which is arranged on a back side of the first and second covers, the piping including a columnar head portion extending along the seam and a plate-like leg portion integrated with the head portion, the leg portion being applied to a first cover side of the sewn portion, and the leg portion being co-sewn by the seam in a state where the head portion is arranged on a portion of the first cover which is folded back at the seam; and a regulating member which regulates a falling direction of the leg portion of the piping, wherein the pad member forms at least a part of an outer shape of the interior equipment and includes: a first design surface covered with the first cover; a second design surface covered with the second cover; and a corner portion forming an edge of the first design surface and connected to the second design surface, wherein the regulating member is attached to a second cover side of the sewn portion and protrudes from an end of the sewn portion, and wherein, in a state of being pressed against the corner portion, the regulating member falls toward the first cover together with the leg portion of the piping which is co-sewn to the sewn portion, and thereby the portion of the first cover which is folded back at the seam is arranged to be overlapped with the sewn portion on the corner portion in a state of being raised by the head portion of the piping.

Accordingly, a portion of the first cover raised by the piping can be arranged along the edge of the pad member by overlapping the portion of the cover with the sewn portion on the corner portion. In addition, since the regulating member, for regulating the falling direction of the leg portion of the piping, falls toward the first cover side together with the leg portion of the piping and the sewn portion by using elastic repulsive force from the corner portion, the falling direction of the leg portion of the piping can be kept constant more reliably.

According to a second aspect of the disclosure, there is provided the interior equipment according to the first aspect, wherein the regulating member is a planar member having flexibility and is applied and fixed to the second cover side of the sewn portion.

Accordingly, the regulating member is configured by a planar member having flexibility, and thereby a problem that the cover raises due to this regulating member (the regulating member projects from an outer surface of the cover) can be avoided well.

According a third aspect of the disclosure, there is provided the interior equipment according to the second aspect, wherein the regulating member is adhered and fixed to the second cover side of the sewn portion, and an end portion of the regulating member protruding from the sewn portion is adhered and fixed to the back side of the first cover.

Accordingly, due to a relatively simple configuration in which both end sides of the regulating member are adhered and fixed to appropriate positions of the covers, the falling direction of the leg portion of the piping can be kept constant more reliably.

According to a fourth aspect of the disclosure, there is provided the interior equipment according to the second aspect, wherein the first cover includes a first seam allowance sewn to the second cover and a second seam allowance provided on a side opposite to the first seam allowance and sewn to a third cover, the third cover being different from the first cover and the second cover, and wherein the regulating member is sewn and fixed to the second cover side of the sewn portion, and an end portion of the regulating member protruding from the sewn portion is sewn and fixed to a side of the second seam allowance.

Accordingly, the both end sides of the regulating member are sewn and relatively strongly attached to the seam allowances corresponding to the covers, respectively, and thereby the falling direction of the leg portion of the piping can be kept constant more reliably.

According to a fifth aspect of the disclosure, there is provided the interior equipment according to any one of the first to fourth aspects, wherein the interior equipment includes a vehicle seat installed in a vehicle compartment.

Accordingly, the portion of the cover raised by the piping can be arranged along the edge of the pad member forming the outer shape of the vehicle seat in a state where the leg portion of the piping falls more stably.

According to a sixth aspect of the disclosure, there is provided the interior equipment according to the fifth aspect, wherein the first design surface of the pad member is a seating surface on which an occupant of the vehicle seat is able to be seated.

Accordingly, a configuration contributing to design improvement of the seat is obtained by arranging the portion of the cover raised by the piping on an edge of a seating surface which is relatively conspicuous.

According to a seventh aspect of the disclosure, there is provided the interior equipment according to any one of the first to sixth aspects, wherein each of the first and second covers includes: a surface member which is made of synthetic leather and forms an outer surface of the interior equipment; and an elastic member which is elastically deformable, the elastic member being laminated with the surface member.

Accordingly, due to the surface member made of synthetic leather forming the outer surface, the interior equipment exhibits an appearance with high quality. Further, even if the surface member made of synthetic leather becomes hard due to shrinkage (sink) caused by heating, the hardness thereof can be complemented by the elastic force of the elastic member.

According to the first aspect of the present disclosure, the portion of the cover raised by the piping can be arranged along the edge of the pad member in a state where the leg portion of the piping falls more stably. According to the second aspect of the present disclosure, the portion of the cover raised by the piping can be arranged along the edge of the pad member with a good design. According to the third aspect of the present disclosure, the portion of the cover raised by the piping can be arranged along the edge of the pad member in a state where the leg portion of the piping falls more stably with a simple configuration. According to the fourth aspect of the present disclosure, the portion of the cover raised by the piping can be arranged along the edge of the pad member in a state where the leg portion of the piping falls more stably. According to the fifth aspect of the present disclosure, the portion of the cover raised by the piping can be arranged along the edge of the pad member of the vehicle seat in a state where the leg portion of the piping falls more stably. According to the sixth aspect of the present disclosure, the portion of the cover raised by the piping can be arranged along the edge of the pad member of the vehicle seat with a good design. According to the seventh aspect of the present disclosure, performance of the portion of the cover raised by the piping can be further improved.

What is claimed is:

1. An interior equipment comprising:
    a pad member which is elastically deformable;
    a first cover which covers the pad member and includes a seam allowance;
    a second cover which covers the pad member and includes a seam allowance, the second cover being different from the first cover;
    a sewn portion where the seam allowances of the first and second covers are overlapped in a state where a front surface of the seam allowance of the first cover and a front surface of the seam allowance of the second cover face each other;
    a seam which sews the seam allowances at the sewn portion;

a piping which is arranged on a back side of the first cover, the piping including a columnar head portion extending along the seam and a plate-shaped leg portion integrated with the head portion, the leg portion being applied to a first cover side of the sewn portion, and the leg portion being co-sewn by the seam in a state where the head portion is arranged on a portion of the first cover which is folded back at the seam; and a regulating member which regulates a falling direction of the leg portion of the piping, wherein the pad member forms at least a part of an outer shape of the interior equipment and includes: a first design surface covered with the first cover; a second design surface covered with the second cover; and a corner portion forming an edge of the first design surface and connected to the second design surface, wherein the regulating member is attached to a second cover side of the sewn portion and protrudes from an end of the sewn portion, and wherein, in a state of being pressed against the corner portion, the regulating member falls toward the first cover together with the leg portion of the piping which is co-sewn to the sewn portion, and thereby the portion of the first cover which is folded back at the seam is arranged to be overlapped with the sewn portion on the corner portion in a state of being raised by the head portion of the piping.

2. The interior equipment according to claim 1, wherein the regulating member is a planar member having flexibility and is applied and fixed to the second cover side of the sewn portion.

3. The interior equipment according to claim 2, wherein the regulating member is adhered and fixed to the second cover side of the sewn portion, and an end portion of the regulating member protruding from the sewn portion is adhered and fixed to the back side of the first cover.

4. The interior equipment according to claim 2, wherein the first cover includes a first seam allowance sewn to the second cover and a second seam allowance provided on a side opposite to the first seam allowance and sewn to a third cover, the third cover being different from the first cover and the second cover, and wherein the regulating member is sewn and fixed to the second cover side of the sewn portion, and an end portion of the regulating member protruding from the sewn portion is sewn and fixed to a side of the second seam allowance.

5. The interior equipment according to claim 1, wherein the interior equipment includes a vehicle seat installed in a vehicle compartment.

6. The interior equipment according to claim 5, wherein the first design surface of the pad member is a seating surface on which an occupant of the vehicle seat is able to be seated.

7. The interior equipment according to claim 1, wherein each of the first and second covers includes:
- a surface member which is made of synthetic leather and forms an outer surface of the interior equipment; and
- an elastic member which is elastically deformable, the elastic member being laminated with the surface member.

* * * * *